No. 628,390.  
E. S. CLARKE.  
CLUTCH.  
(Application filed May 26, 1898.)  
Patented July 4, 1899.
(No Model.)
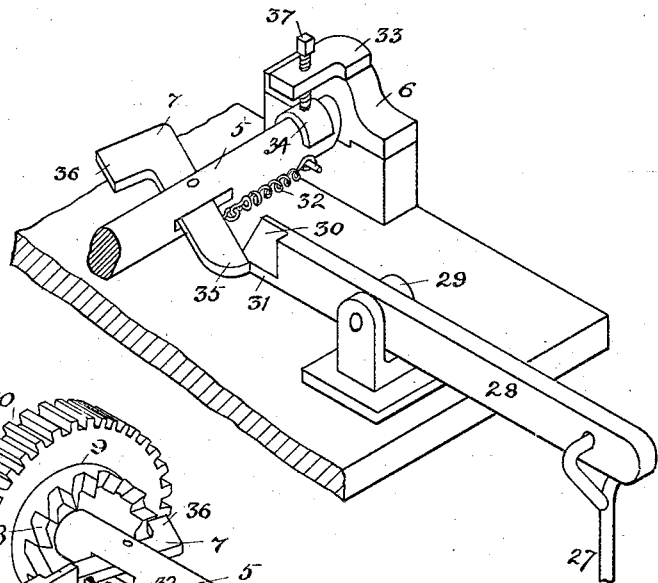
Fig. I.
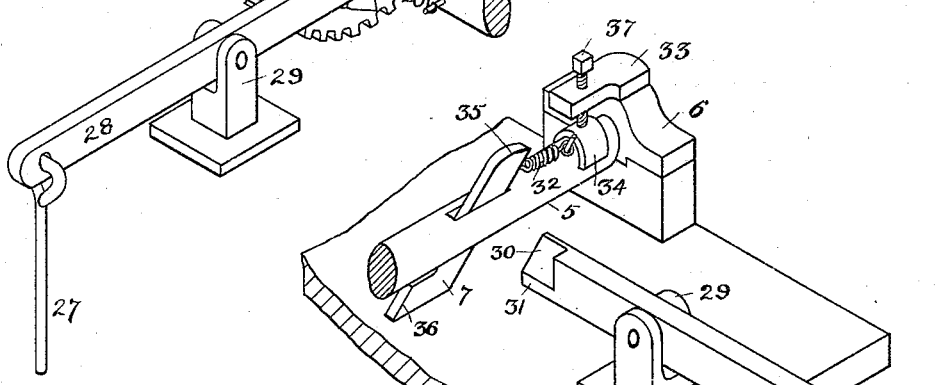
Fig. II.
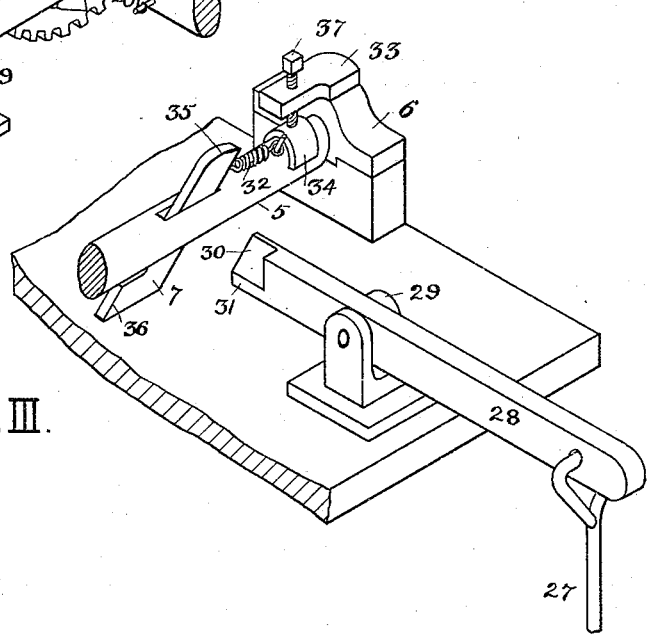
Fig. III.
WITNESSES:  
Wm Lee Noland  
Henry E. Baskerville.
INVENTOR:  
Edward Summerfield Clarke.  
BY Stewart & Stewart  
his ATTORNEYS.

UNITED STATES PATENT OFFICE.

EDWARD SUMMERFIELD CLARKE, OF RICHMOND, VIRGINIA.

CLUTCH.

SPECIFICATION forming part of Letters Patent No. 628,390, dated July 4, 1899.

Application filed May 26, 1898. Serial No. 681,785. (No model.)

*To all whom it may concern:*

Be it known that I, EDWARD SUMMERFIELD CLARKE, a citizen of the United States of America, and a resident of Richmond city, State of Virginia, have invented certain new and useful Improvements in Clutches, of which the following is a specification.

My invention relates to clutches such as are used for connecting driving-pulleys and their shafts or for making and breaking connection between a constantly-revolving shaft and a machine; and its object is to provide a device which shall be simple, strong, and durable and which shall be adapted to be so operated as to limit the movement of the driven shaft to a single revolution. Devices of this kind are used in connection with sawing-machines, stamping and punching machines, &c.

In the accompanying drawings, which form a part of this specification, and in which like figures represent like parts, Figure I shows a detail in perspective of the clutch. Fig. II shows in perspective the general arrangement of the clutch and a part of the driven shaft. Fig. III shows the same detail of the clutch as that shown in Fig. I, but in a different position.

In the drawings, 5 is a driven shaft to which an intermittent rotary motion is to be given by means of the clutch and which is carried in suitable bearings, one of which is shown at 6 in Figs. I and III. Mounted loose on the shaft 5 is the spur-gear 10, which has attached to it the disk 9, having teeth 8. Pivoted in a slot in the shaft 5 is the pawl 7, having the ends 35 and 36. Attached to the pawl 7, near its end 35, is the spring 32, the other end of which is attached to the shaft 5.

28 is a lever pivoted at 29 and having at one end the inclined face 30. To the other end of the lever 28 is attached a rod 27, which may be operated to lower that end of the lever to which it is attached by hand or by a treadle. The lever 28 is so arranged that its normal position is that shown in the drawings. This may be very simply effected by means of a balance-weight or a spring attached to the lever itself, or to the rod 27, or to the treadle.

The motive power is derived from a constantly-revolving shaft on which is rigidly mounted a pinion. This pinion (not shown in the drawings) is made to gear with the spur-gear 10, which is mounted loose on the shaft 5, thus giving to the said spur-gear 10, and consequently to the toothed disk 9, a constant rotary motion.

The operation of the clutch is as follows: The shaft 5 is at rest. The spur-gear 10 and the toothed disk 9 are constantly revolving in the direction indicated by the arrow. The lever 28 is in its normal position. The end 35 of the pawl 7 is resting against the face 31 of the lever 28. The spring 32 is in tension and is tending to pull the end 36 of the pawl 7 into gear with the teeth 8 of the disk 9. To set the shaft 5 in motion, the operator depresses the rod 27, thereby raising that end of the lever 28 which has the inclined face 30 and so freeing the pawl 7. The spring 32 acting on the pawl 7 throws its end 36 into gear with the teeth 8 of the disk 9, which being attached to the constantly-revolving gear 10 causes the pawl 7 and the shaft 5 to revolve in the direction indicated by the arrow. (See Fig. II.) Fig. III shows the pawl 7 and the shaft 5 nearing the end of a revolution. As the end 35 of the pawl 7 comes down it strikes on the sloping face 30 of the lever 28, which has returned to its normal position after the removal of the pressure on the rod 27 or other means by which the lever 28 may be operated, and continuing to come down the said end 35 of the pawl 72 slides down the inclined face 30 of the lever 28, and is consequently forced to one side until it reaches the face 31 of the said lever 28, by which time the end 36 of the said pawl 7 has been drawn out of gear with the teeth 8 of the toothed disk 9. In order to prevent the pawl 7 and the shaft 5 from continuing from their momentum to revolve and so pass the point at which they are shown in Fig. I, a friction-brake is used, consisting of a shoe 34, a set-screw 37, held in a bracket 33, which is attached to any convenient point, such as the bearing 6. By adjusting the set-screw 37 the shoe 34 can be caused to bear with more or less pressure upon the shaft 5. The use of any form of brake will be unnecessary with those machines in which the stored-up energy of the moving parts is insufficient to overcome the resistance of the machine.

A modified form of my improved clutch can be arranged by using instead of the pawl 7 another toothed section to engage with the toothed disk 9. This toothed section would be arranged to slide on a "feather" attached to the shaft 5 and would be forced into engagement with the toothed disk 9 by means of a compression-spring. From this toothed section there would project a pin, which would strike against the inclined face 30 of the lever 28 at the end of each revolution of the shaft 5 to withdraw the toothed section from engagement with the toothed disk 9. The inclined face 30 of the lever 28 would in this case be cut on the side of the lever opposite to that shown in Figs. I and III.

Another valuable feature of my improved clutch is that it can be made to transmit a constant motion or an intermittent motion to the shaft 5 at the will of the operator. If it be desired to cause the clutch to transmit a constant motion to the shaft 5, the operator by depressing the rod 27 raises that end of the lever 28 which has the inclined face 30 so high that the end 35 of the pawl 7 will when it comes down altogether miss the end of the lever 28—that is to say, he raises the end of the lever 28 out of the path of the pawl 7. When he desires to stop the machine, he simply allows the lever 28 to resume its normal position.

Having now described my invention, what I claim, and desire to secure by Letters Patent of the United States, is—

In a clutch, the combination of a shaft, a spring-actuated dog or pawl pivotally attached to the shaft and adapted to engage projections on a driving member, a spring to force the dog or pawl into engagement with the projections on the driving member, a driving member having projections adapted to engage the dog or pawl to drive the shaft, a lever having an inclined face adapted to withdraw the dog or pawl from engagement with the projections on the driving member at the end of each revolution of the said driving member, and having another face to hold the dog or pawl out of engagement with the projections on the driving member at the end of each revolution of the said driving member.

Signed by me at Richmond city this 23d day of May, 1898.

EDWARD SUMMERFIELD CLARKE.

Witnesses:
HENRY E. BASKEWILL,
ARTHUR SCRIVENOR.